Nov. 16, 1965    H. G. SHAKESPEARE    3,218,075
GOLF BALL
Filed May 10, 1962
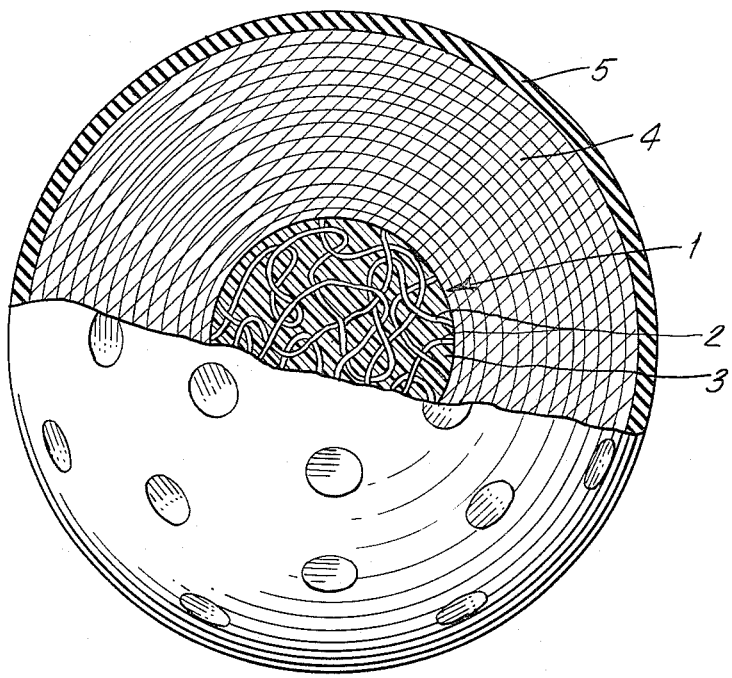
INVENTOR.
HENRY G. SHAKESPEARE
BY
        ATTORNEYS

United States Patent Office 3,218,075
Patented Nov. 16, 1965

3,218,075
GOLF BALL
Henry G. Shakespeare, Richland, Mich., assignor to Shakespeare Company, Kalamazoo, Mich., a corporation of Michigan
Filed May 10, 1962, Ser. No. 193,868
3 Claims. (Cl. 273—227)

This invention relates to golf balls and particularly to those which, even under most severe conditions of use, will retain their original shape and roundness and will not assume a permanent distortion or set and will remain in desired balance.

Heretofore, various materials have been employed in making golf balls and, in particular, in making the core thereof which are wrapped in rubber strips or threads which are then enclosed in the conventional cover.

The core should be made of material which will not become permanently deformed when the force involved in playing golf with the ball is encountered so that the ball can retain its roundness and balance even though subjected to heavy pounding.

Furthermore, it is essential that the specific gravity of the core material be such that when the core is combined with the other elements forming the ball, the ball will have the size and weight prescribed by golf rules and regulations.

Various materials have been employed in making golf balls and cores therefor, but none of them have had the complete resiliency involved in the present invention or the complete freedom from deformation coupled with toughness and lack of brittleness.

The glass itself is one of the few known practically completely resilient materials which will not, under any normal conditions, assume any measurable set or deformation. However, glass, per se, in spite of its full and complete resiliency is too britle as a practical material for use in a golf ball core.

According to the present invention a core is provided which has the complete resiliency of glass but which will not be shattered when the ball is hit in play.

The core is made up of a high content of fiber glass fibers which are bonded together with a suitable resin and are molded into spherical form. Such a core has the complete resiliency of glass, that is it will not take a permanent set of deformation and even though considerably flattened will return to its original shape.

Thus, when such a core is wound with strips or threads of rubber to the size desired and a golf ball cover is then placed or molded on the outer surface the resultant ball will have an unexpectedly high degree of resilience. It will not be flattened or deformed in use for playing golf and since the core is resilient and free from deformation, the ball retains its desired balance thus eliminating irregularities in flight or roll which would be produced with a distorted core.

In the preferred form of the invention the core consists of a plurality of fibers of fiber glass of the fineness normally used in the manufacture of fishing rods or the like. This is admixed with suitable resin of the type which may be molded and which then takes on permanent set due to the polymerization at room temperature assisted by a catalyst or elevated temperatures.

There are many suitable polymerizable polyester materials which can be used in making the core. Those which have high resiliency and resistance to shattering should be employed although the incorporation of the glass fibers in the core tends to resist shattering when the core is wrapped in the layer of rubber threads and is then encased in the cover.

In addition to polyesters many other resins having the resiliency and lack of brittleness may be employed.

There are suitable epoxy resins as well as many others. I have found that a highly satisfactory product will be obtained if the resin employed is a polymerizable, ethylenically unsaturated polyester which is the product of a reaction between at least one dicarboxylic acid including a ethylenically unsaturated dicarboxylic acid and at least one polyhydroxy alcohol in which is incorporated 0.05 percent to about 0.25 percent of sulphur, based upon the weight of the polyester binder to stabilize the composition.

In making the core the fiber glass and the resin in the unpolymerized state are intimately mixed together. The cores may then be molded to spherical shape. This may be done in suitable manner. It is possible to extrude the material to substantially the right diameter, cut off a portion and mold it.

Highly satisfactory results are obtained when 50% of fiber class is incorporated in the mixture although higher quantities may be employed, care being taken to see that sufficient resin is present in the final mixture to retain the glass in the molded shape.

After the molding the resin is polymerized or otherwise set. The molded core is then wrapped in a conventional manner and the outer core is applied as is customary.

The single figure of the drawing shows a golf ball partly in section made in accordance with the invention. The ball has the central hard resilient spherical core 1 which consists of fiber glass 2 uniformly distributed therethrough and bonded and retained in position with a resin 3 which, as stated, is a hard resilient resin either of polymerized polyester resins, or an epoxy resin, or an equivalent.

Wrapped upon this core in customary fashion is a layer of rubber threads 4, and the entire ball has an enveloping cover 5, made of any of the accepted suitable cover material for golf balls.

A ball made in accordance with this invention will meet the requirements of the rules as to weight and size. It will give excellent distance and because the core has such a high percentage of glass it will not be subject to permanent set or deformation when the ball is hit even though, as well known, the ball is materially flattened during impact. The ball thus flies and rolls true even after considerable play.

The core is hard and highly resistant to permanent deformation and thus helping to develop in full the desired properties in the ball.

It will be appreciated that in carrying out the invention departure can be made from the specific form of the invention disclosed and described above, which is merely illustrative of the invention. It is not intended that the invention be restricted to this specific form.

I claim:

1. A golf ball comprising a central hard resilient spherical core resistant to permanent deformation comprising fiber glass uniformly distributed through the core and bonded and retained in position by a hard resilient resin and having thereon a layer of wrapped rubber thread and an enveloping cover.

2. A golf ball comprising a central hard resilient spherical core resistant to permanent deformation comprising fiber glass uniformly distributed through the core and bonded and retained in position by a hard resilient resin selected from the group consisting of polymerized polyester resons and epoxy resins and having thereon a layer of wrapped rubber thread and an enveloping cover.

3. A golf ball comprising a central hard resilient spherical core resistant to permanent deformation comprising fiber glass uniformly distributed through the core and bonded and retained in position by a hard resilient polymerized ethylenically unsaturated polyester resin and having thereon a layer of wrapped rubber thread and an enveloping cover.

References Cited by the Examiner
UNITED STATES PATENTS

| | | | |
|---|---|---|---|
| 2,070,553 | 2/1937 | Pullman | 117—161 |
| 2,652,254 | 9/1953 | Verburg | 273—227 |
| 3,037,771 | 6/1962 | Gambino | 273 |

FOREIGN PATENTS 166,430  3/1959  Switzerland.

OTHER REFERENCES

Modern Plastics Magazine, "Epoxies," p. 90, October 1952 edition.

RICHARD C. PINKHAM, *Primary Examiner.*

LEONARD W. VARNER, LOUIS R. PRINCE,
*Examiners.*